United States Patent [19]

Gourlaouen et al.

[11] Patent Number: 4,698,175

[45] Date of Patent: Oct. 6, 1987

[54] NEODYMIUM HYDROXY/AMMONIUM NITRATE

[75] Inventors: Claire Gourlaouen; Claude Magnier, both of Paris; Bertrand Latourrette, Le Raincy; Anne Tugaye, Bougival; Francoise Deneuve, Paris, all of France

[73] Assignee: Rhone-Poulenc Specialties Chimiques, Courbevoie, France

[21] Appl. No.: 884,630

[22] Filed: Jul. 11, 1986

[30] Foreign Application Priority Data

Jul. 11, 1985 [FR] France ............................. 85/10618

[51] Int. Cl.$^4$ .................... C09K 3/00; C01F 17/00
[52] U.S. Cl. ................................ 252/182; 423/21.1; 423/263
[58] Field of Search ............... 252/182; 423/21.1, 263

[56] References Cited

U.S. PATENT DOCUMENTS 2,364,613 12/1944 Ballard et al. .................... 423/21.1
3,761,571 9/1973 Woodhead ........................... 423/263

OTHER PUBLICATIONS

Louer et al., Chem. Abs., 105 (No. 24), abs. No. 216983g.
Mullica et al., Chem. Abs., 105 (No. 10), abs. No. 89019.
Haschke, Chem. Abs., 81 (No. 12), abs. No. 71975e.

Primary Examiner—Edward A. Miller
Attorney, Agent, or Firm—Burns, Doane, Swecker & Mathis

[57] ABSTRACT

A novel neodymium hydroxy/ammonium nitrate, readily calcined into, e.g., neodymium oxide, $Nd_2O_3$, has the formula (I):

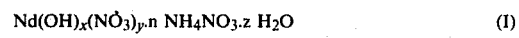

$$Nd(OH)_x(NO_3)_y \cdot n\, NH_4NO_3 \cdot z\, H_2O \qquad (I)$$

wherein $2 \leq x \leq 2.3, 0.7 \leq y \leq 1.0, 0.8 \leq z \leq 1.25$; and $0.8 \leq n \leq 1.25$.

13 Claims, 2 Drawing Figures

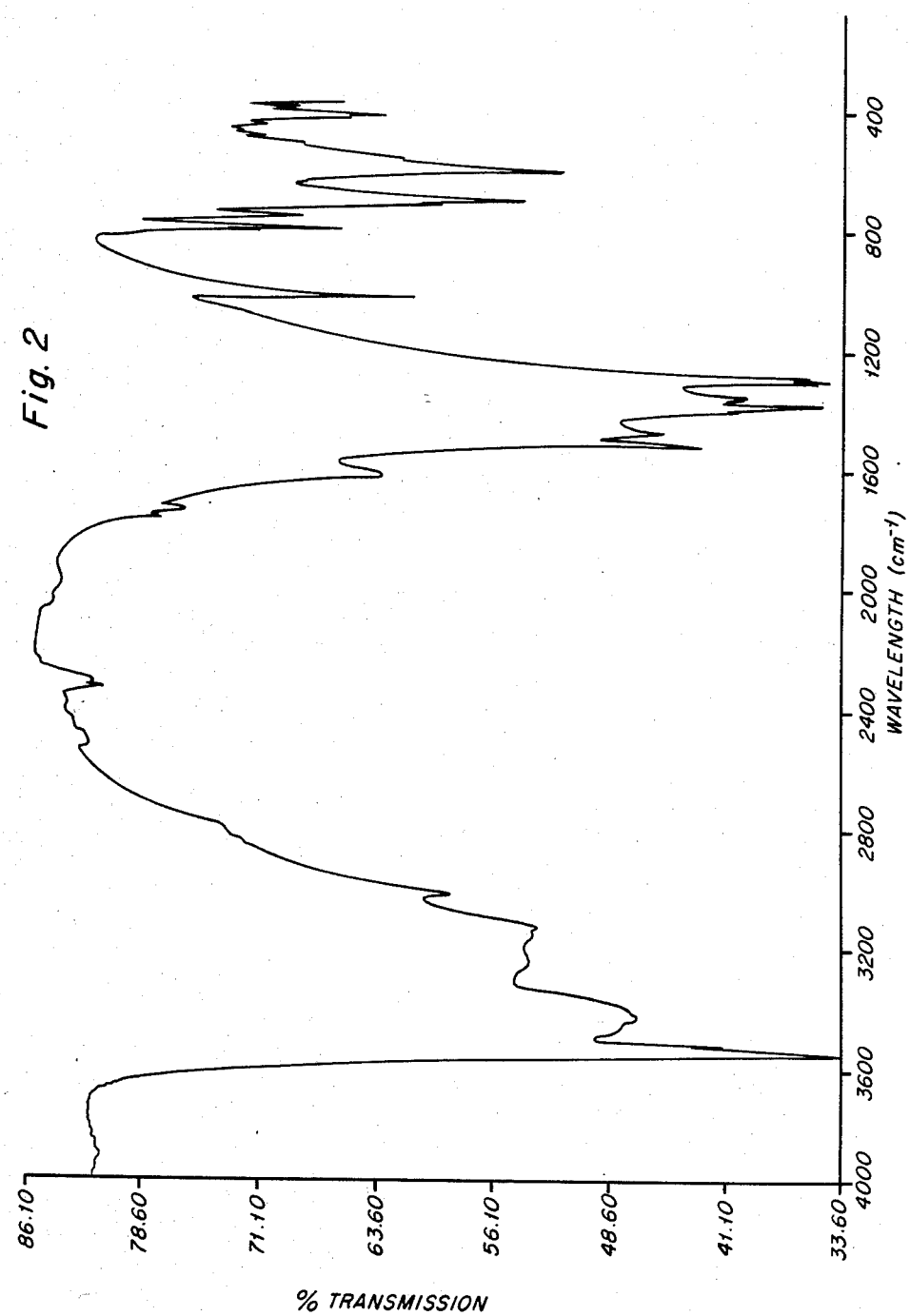

NEODYMIUM HYDROXY/AMMONIUM NITRATE

BACKGROUND OF THE INVENTION

1. Field of the Invention

The present invention relates to a novel neodymium compound and, more especially, to a novel double salt of neodymium hydroxynitrate and ammonium nitrate. This invention also relates to a process for the preparation of the subject double salt, and to industrial applications thereof.

2. Summary of the Invention

A major object of the present invention is the provision of a novel neodymium compound having the following formula (I):

$$Nd(OH)_x (NO_3)_y \cdot n\, NH_4NO_3 \cdot z\, H_2O \qquad (I)$$

wherein:

$$2 \leq x \leq 2.3$$

$$0.7 \leq y \leq 1.0$$

$$0.8 \leq z \leq 1.25$$

$$0.8 \leq n \leq 1.25$$

The neodymium compound corresponding to the formula (I) has the following characteristics:

(a) Morphology

The subject neodymium hydroxynitrate is present in the form of agglomerates having dimensions ranging from 1.0 to 50 μm.

The morphologic appearance of the title compound is as shown in FIG. 1, a scanning electron micrograph (G=3000).

(b) Crystalline structure

X-ray diffraction analysis evidences that the neodymium compound of the formula (I) is a well crystallized material; its degree of crystallization ranges from 70 to 90%.

Its X-ray spectrum obtained with respect to monochromatic copper radiation (Kα CuλZ=1.5418 Å) is as follows:

| Bragg angle 2 Θ observed | Planar distance d(Å) | Relative intensity I/Io |
|---|---|---|
| 7.24 | 12.20 | 100 |
| 14.43 | 6.13 | 26 |
| 21.72 | 4.09 | 18 |
| 24.95 | 3.57 | 24 |
| 25.99 | 3.43 | 19 |
| 26.51 | 3.36 | 28 |
| 27.42 | 3.25 | 15 |
| 29.02 | 3.07 | 10 |
| 44.86 | 2.019 | 11 |
| 45.49 | 1.993 | 13 |

(c) Chemical composition

It corresponds to the chemical formula given above. This is confirmed qualitatively by infrared spectrophotometry:

FIG. 2 shows the spectrum obtained by incorporation in KBr. The characteristic peaks are:

OH⁻ bands = 3550 cm⁻¹

NO₃⁻ bands = 1660 cm⁻¹, 1525 cm⁻¹, 1480 cm⁻¹, 1310 cm⁻¹, 1060 cm⁻¹, 718 cm⁻¹ and 610 cm⁻¹.

The chemical composition of the compound of the invention has also been confirmed quantitatively:

(i) By chemical analysis:

(1) The neodymium is titrated in a sample (100 to 150 mg) dissolved in a few drops of 4N nitric acid, then diluted in an acetic buffer (pH=5.8), by EDTA determination in the presence of xylenol orange;

(2) The OH⁻ group is determined in a sample of approximately 100 mg dissolved in 20 cm³ 0.1N hydrochloric acid, with the aid of a 0.1N sodium hydroxide solution;

(3) The NH₄⁺ group is determined by acidimetry after evaporation to dryness; and (4) The NO₃⁻ group is reduced by means of a Devarda reducing agent, then determined by acidimetry after evaporation to dryness.

The elemental analysis expressed in % by weight is as follows, the water content being determined by subtraction:

| | Nd³⁺ | OH⁻ | NO₃⁻ | NH₄⁺ | H₂O |
|---|---|---|---|---|---|
| % | 38.3±1 to 42.1±1 | 8.9±1 to 11.3±1 | 35.7±5 to 36.6±5 | 6.4±1 to 6.6±1 | 4.5±3 to 6.5±3 | which corresponds to the following calculated formula:

$$Nd(OH)_{2-2.3} (NO_3)_{0.7-1.0} \cdot 0.8\text{-}1.25\, NH_4NO_3 \cdot 0.8\text{-}1.25\, H_2O$$

(ii) By thermogravimetry:

The results obtained are reported in the following table:

| | |
|---|---|
| 25/280° C. | 13.7% to 17.8% |
| 280/340° C. | 1.8% to 6.6% |
| 340/420° C. | 7.5% to 9.6% |
| 420/490° C. | 11.7% to 14.4% |
| 490/620° C. | 9.5% to 10.3% |
| 620/1000° C. | 4.9% to 8.1% |
| Δ P 1000° C. | 49.1% to 66.8% |

The aforesaid neodymium compound (I) is advantageously prepared by the following process, which circumscribes another object of the invention.

Briefly, this process for the preparation of the neodymium double salt of the formula (I) comprises:

(i) reacting an aqueous solution of neodymium nitrate with ammonia under conditions such that either the molar ratio between the OH⁻ ion concentration of the base and the concentration of the neodymium nitrate solution, expressed as the cation Nd³⁺, is greater than 2.2, or, if said ratio is less than or equal to 2.2, the concentration of the solution of the neodymium nitrate is at the most 1.0 mole/liter;

(ii) separating the precipitate thus formed; and (iii) drying said precipitate.

DETAILED DESCRIPTION OF THE PREFERRED EMBODIMENTS OF THE INVENTION

Figure 1:
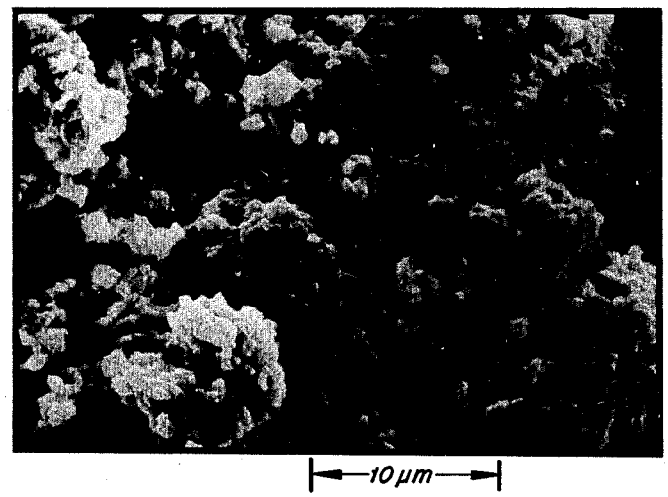

More particularly according to the present invention, in the first stage of the aforedescribed process, the aqueous neodymium nitrate solution is admixed with the base.

Consistent herewith, the neodymium nitrate is used in either the anhydrous form, or in the hydrated state, $Nd(NO_3)_3 \cdot 6 H_2O$.

The purity of the neodymium salt is selected as a function of the intended application thereof.

The concentration of the neodymium nitrate solution according to the invention is a function of the molar ratio $[OH^-]/[Nd^{3+}]$. It is more fully defined hereinbelow.

The acidity of said solution is not critical according to the invention.

The base reactant used in the process of the invention is typically an aqueous solution.

Gaseous ammonia may also be used.

According to this invention, an aqueous ammonia solution is the preferred base.

The normality of the basic solution is not critical according to the invention. It may vary over wide limits, for example, from 0.1 to 11N, but preferably a solution having a concentration of from 2 to 11N is used.

The proportion of the basic solution to the neodymium nitrate solution is advantageously such that the molar ratio $[OH^-]/[Nd^{3+}]$ is greater than 0.1 and less than or equal to 2.2.

It follows from the above that the proportion of the basic solution and the solution of neodymium nitrate is a function of the concentration of the neodymium nitrate solution.

If the molar ratio $[OH^{-1}]/[ND^{3+}]$ is greater than 2.2, the concentration of the neodymium nitrate solution is not critical and may vary over wide limits. It may range, expressed as the $Nd^{3+}$ cation, for example, from 0.1 to 6 moles/liter.

If the molar ratio $[OH^-]/[Nd^{+3}]$ is less than or equal to 2.2, the concentration of the neodymium nitrate solution is at most equal to 1.0 mole/liter and preferably ranges from 0.1 to 1.0 mole/liter.

In a preferred embodiment of the invention, a concentration of the neodymium nitrate solution is selected, expressed as $Nd^{3+}$ cation, of from 1 mole/liter to 2 mole/liter, as is a molar ratio $[OH^-]/[Nd^{3+}]$ of from 2.2 to 3.0.

In order to provide for the production of the neodymium compound of the formula (I), it is necessary to have a minimum concentration of ammonium nitrate in the reaction medium, at least 1 mole/liter, and a higher concentration is not a critical consideration.

If the concentrations of the reagents are low, i.e., if the concentration of the base is less than or equal to 1 mole/liter, or if the concentration of the neodymium nitrate solution is less than or equal to 0.6 mole/liter in $Nd^{3+}$, it is also possible to externally introduce ammonium nitrate, the amount of which is determined as a function of the concentrations of the reagent solutions.

The ammonium nitrate may be employed in the anhydrous form, or as the hydrate, $NH_4NO_3 \cdot 6 H_2O$. It is preferably used in the crystalline form. An aqueous solution may also be used; it is preferably prepared as concentrated as possible, for example, on the order of 200 g/l, such as to avoid diluting the reaction medium.

The admixture of the aforementioned reagents may be carried out according to any one of a number of variations. For example, the mixture of the aqueous solution of neodymium nitrate and the ammonia solution may be effected simultaneously under agitation, or the base may be added continuously, or in a single batch, to the neodymium nitrate solution, or conversely. If the ammonium nitrate is externally added, it is preferable to introduce it into the neodymium nitrate solution.

The flow rates of the addition of the solutions of the reagents are adjusted such that the aforenoted ratio of $[OH^-]/[Nd^{3+}]$ is attained.

It is also possible to control the flow rates by regulating the pH, which most frequently ranges from 7.5 to 9.5.

The temperature of the reaction medium preferably ranges from 10° to 50° C. and more particularly from 10° to 30° C.

The dwell time of the mixture in the reaction medium may vary over wide limits, from at least 0.1 second to several hours, for example, 48 hours or more. A retention or dwell time of 5 min to 30 min is generally satisfactory.

The conditions of agitation should be relatively vigorous. The speed of the agitation depends upon the type of agitator and the ratio of the diameter of the agitator to that of the reactor. As an example, the speed of a four-blade agitator, which rotates very close to the walls of a reactor having a 15 cm diameter (useful volume=750 cm3) is set at 100 to 1000 rpm.

The second stage of the process of the invention comprises separating the precipitate which results, which precipitate is in suspension in the reaction mass.

The precipitate may be separated from the reaction medium by conventional techniques for liquid/solid separation, in particular by filtration or centrifugation, which is preferred for short retention or dwell times. The separation is typically carried out at ambient temperature, most frequently from 15° to 25° C.

The precipitate obtained after separation is then subjected to a drying stage.

Drying may be carried out in air, or under a reduced pressure on the order of $10^{-2}$ to 100 mm mercury (1.33 to $1.33 \times 10^4$ Pa).

The drying temperature may range from ambient to 200° C.

The duration of drying is a function of temperature: it is not critical and may range from 20 min to 48 hr, but preferably ranges from 2 hr to 8 hr.

The product compound corresponding to formula (I), which is stable, may be subjected, if necessary, to purification by recrystallization in water or a light organic solvent, for example, ethanol, methanol, acetone or diethyl ether.

This operation is carried out at a temperature between ambient temperature and a temperature lower than the boiling point of the solvent.

The process of the invention may be carried out in conventional apparatus. The stage of the mixing of the solutions of the reagents is effected in a reactor equipped with suitable heating means, for example, by hot water circulation in the double jacket of the reactor, or by means of heat exchangers (coils). The reactor must also be equipped with the usual temperature control devices (thermometers) and agitators (blade, anchor, screw or turbine agitator), together with a device for the introduction of one or two reagents in the form of an aqueous solution, for example, a metering pump.

The apparatus to be used for carrying out the separation and drying operations does not require any particular characteristics.

The suspension obtained may be filtered on a filter under the pressure of an inert gas, such as nitrogen, a vacuum filter (Buchner, Nutche) or on a continuous filtering device, such as, for example, a Vernay type rotating filter or a belt filter.

The precipitate is placed into silica, porcelain or alumina boats and subjected to the drying operation, which may be carried out in a drying apparatus, for example, in a ventilated or vacuum oven, or in a desiccator under reduced pressure assured by a glass filter pump.

According to the invention, a neodymium compound corresponding to formula (I) is obtained which may be used as an industrial intermediate, in particular, for the production of neodymium oxides or carbonates.

One notable use of the compound of the invention is in the preparation of neodymium oxides by calcination of the neodymium hydroxynitrate having the formula (I).

The neodymium compound of the formula (I), in the dry state, is subjected to calcination at a temperature of from approximately 650° to approximately 1300° C.

The duration of the calcination is not critical and most frequently ranges from 1 hr to 4 hr.

A neodymium oxide having a specific surface, after calcination at temperatures of from 700° to 900° C., of from 5 to 30 m$^2$/g is produced. The specific surface is defined as the B.E.T. specific surface, determined by the method of BRUNAUER, EMMETT, TELLER, as described in *J.A.C.S.*, 60, 309 (1938).

In order to further illustrate the present invention and the advantages thereof, the following specific examples are given, it being understood that same are intended only as illustrative and in nowise limitative.

EXAMPLE 1

Into a two liter reactor having a double jacket in which water was circulating and maintained at 20° C., and equipped with a thermometer, a system for the introduction of reagents, and an agitator (four-blade agitator), the following materials were simultaneously introduced, at the respective flow rates of 1400 cm$^3$/hr and 900 cm$^3$/hr:

(i) an aqueous solution of neodymium nitrate, containing 2.54 moles/liter of Nd$^{3+}$; and (ii) an aqueous 10.5N ammonia solution, with the OH$^-$/Nd$^{3+}$ ratio equal to 2.8.

The temperature of the reaction medium was 20° C.

The dwell time of the mixture in the reaction medium was 20 min.

The velocity of agitation was 450 rpm.

After 20 min, the reaction mass was filtered at ambient temperature on a Buchner filter.

The precipitate obtained was then dried in an oven at 200° C. for 2 hr.

A neodymium compound having the formula

Nd(OH)$_{2.15}$(NO$_3$)$_{0.85}$1.25 NH$_4$NO$_3$ ·1.05 H$_2$O was produced.

The IR and X-ray spectra conform to those given above.

EXAMPLE 2

Into the apparatus described in Example 1, the following materials were simultaneously introduced at the respective flow rates of 1385 cm$^3$/hr and 837 cm$^3$/hr:

(i) an aqueous solution of neodymium nitrate, containing 0.48 mole/liter Nd$^{3+}$, to which crystalline ammonium nitrate NH$_4$NO$_3$ ·6 H$_2$O was added at a rate of 100 g/liter; and (ii) a 2N aqueous ammonia solution, with the OH$^-$/Nd$^{3+}$ ratio being equal to 2.6.

The other conditions of operation were identical to those set forth in Example 1.

A neodymium compound was obtained, the X-ray spectrum of which confirmed the presence of a neodymium double salt of the formula (I).

EXAMPLE 3

10 g of the compound prepared in Example 1 were sampled.

The material was deposited into a boat, which was placed in a tubular furnace. The temperature was raised at a rate of 9° C. per minute to 700° C., which was maintained for 1 hr. Cooling was permitted at the inertial rate of the furnace.

4.8 g of a calcined product having the formula Nd$_2$O$_3$ (ASTM 21-579) were obtained, having a BET specific surface, after calcination at 700° C., of 19 m$^2$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A compound having the formula (I):

Nd(OH)$_x$ (NO$_3$)$_y$·n NH$_4$NO$_3$·z H$_2$O     (I)

wherein 2≦x≦2.3, 0.7≦y≦1.0, 0.8≦z≦1.25, and 0.8≦n≦1.25.

2. The compound as defined by claim 1, in the form of agglomerates ranging in size from 1.0 to 50 μm.

3. The compound as defined by claim 1, having a degree of crystallinity ranging from 70 to 90%.

4. The compound as defined by claim 1, having an elemental analysis of 38.3±1 to 42.1±1% Nd$^{3+}$, 8.9±1 to 11.3±1% OH$^-$, 35.7±5 to 39.6±5% NO$_3^-$, 6.4±1 to 6.6±1% NH$_4^+$ and 4.5±3 to 6.5±3% H$_2$O.

5. A process for the preparation of the neodymium compound as defined by claim 1, comprising (i) reacting an aqueous solution of neodymium nitrate with ammonia base under conditions such that either the molar ratio between the concentration of OH$^-$ ions of the ammonia base and the concentration of neodymium nitrate, expressed as Nd$^{3+}$, is greater than 2.2 or, if said ratio is less than or equal to 2.2, the concentration of the neodymium nitrate, also expressed as Nd$^{3+}$, is at most 1.0 mole/liter, (ii) separating the neodymium hydroxy/ammonium nitrate thus formed, and (iii) drying said neodymium hydroxy/ ammonium nitrate precipitate.

6. The process as defined by claim 5, wherein the ammonia base comprises aqueous or gaseous ammonium.

7. The process as defined by claim 6, wherein the ammonia base comprises a solution, the normality of which ranging from 0.1 to 11N.

8. The process as defined by claim 7, the normality of said basic solution ranging from 2 to 11N.

9. The process as defined by claim 5, wherein the molar ratio [OH$^-$]/[Nd$^{3+}$] is greater than 2.2 and the concentration of the neodymium nitrate solution, expressed as Nd$^{3+}$, ranges from 0.1 to 6.0 moles/liter.

10. The process as defined by claim 5, wherein the [OH$^-$]/[Nd$^{3+}$] ratio is less than or equal to 2.2 and the concentration of the neodymium nitrate solution, expressed as $Nd^{3+}$, ranges from 0.1 to 1.0 moles/liter.

11. The process as defined by claim 10, wherein the molar ratio $[OH^-]/[Nd^{3+}]$ ranges from 2.2 to 3.0 and the concentration of the neodymium nitrate solution, expressed as $Nd^{3+}$, ranges from 1.0 to 2.0 moles/liter.

12. The process as defined by claim 5, comprising externally adding ammonium nitrate to the reaction medium when the concentration of the ammonia base is less than or equal to 1 mole/liter.

13. The process as defined by claim 5, wherein the temperature of the reaction medium ranges from 10° to 50° C.

* * * * *